Jan. 4, 1966 Q. GNUTTI 3,226,742
INDEXIBLE TURRET MEANS
Filed Oct. 17, 1963 4 Sheets-Sheet 1
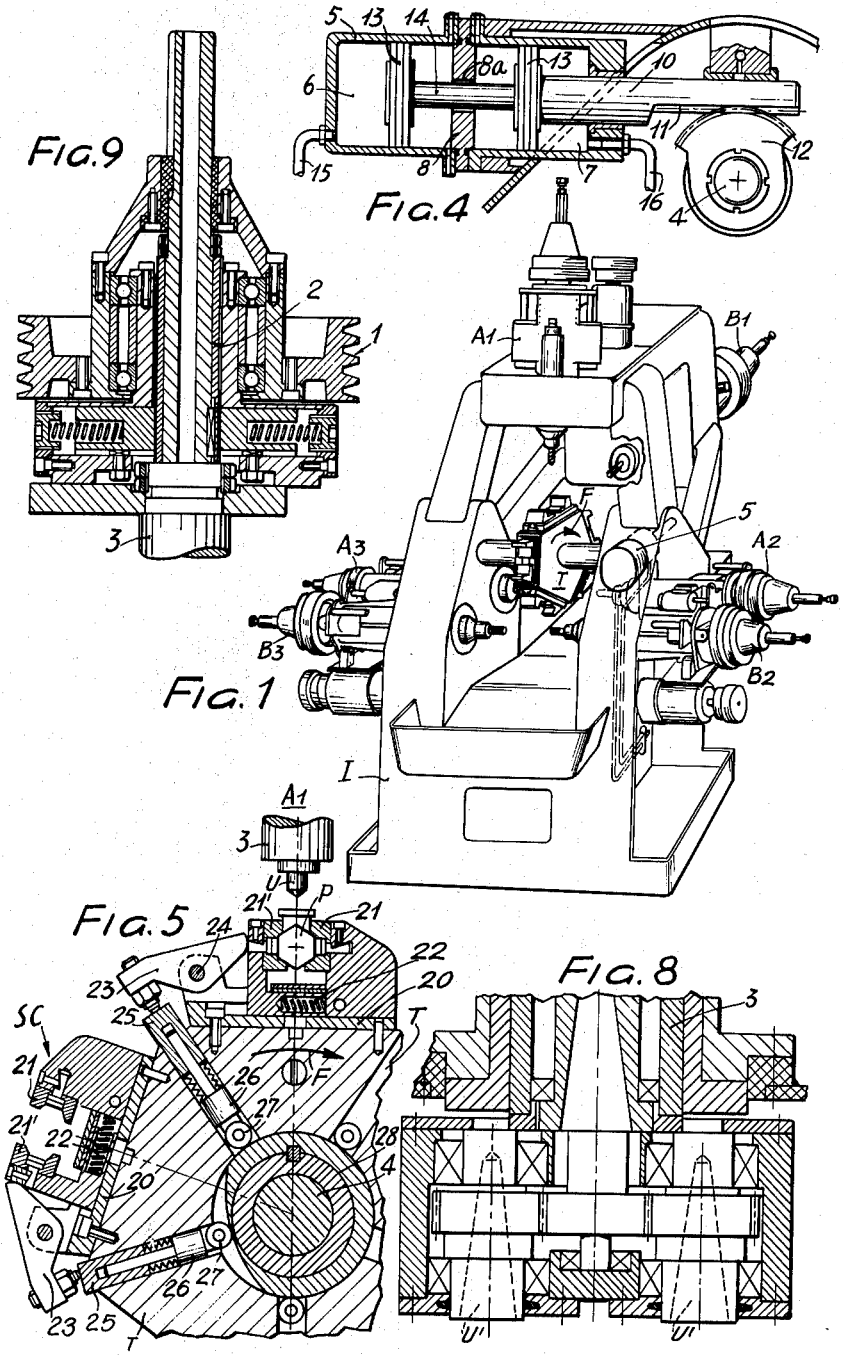
INVENTOR.
QUIRINO GNUTTI
BY Irvin S. Thompson
ATTORNEY.

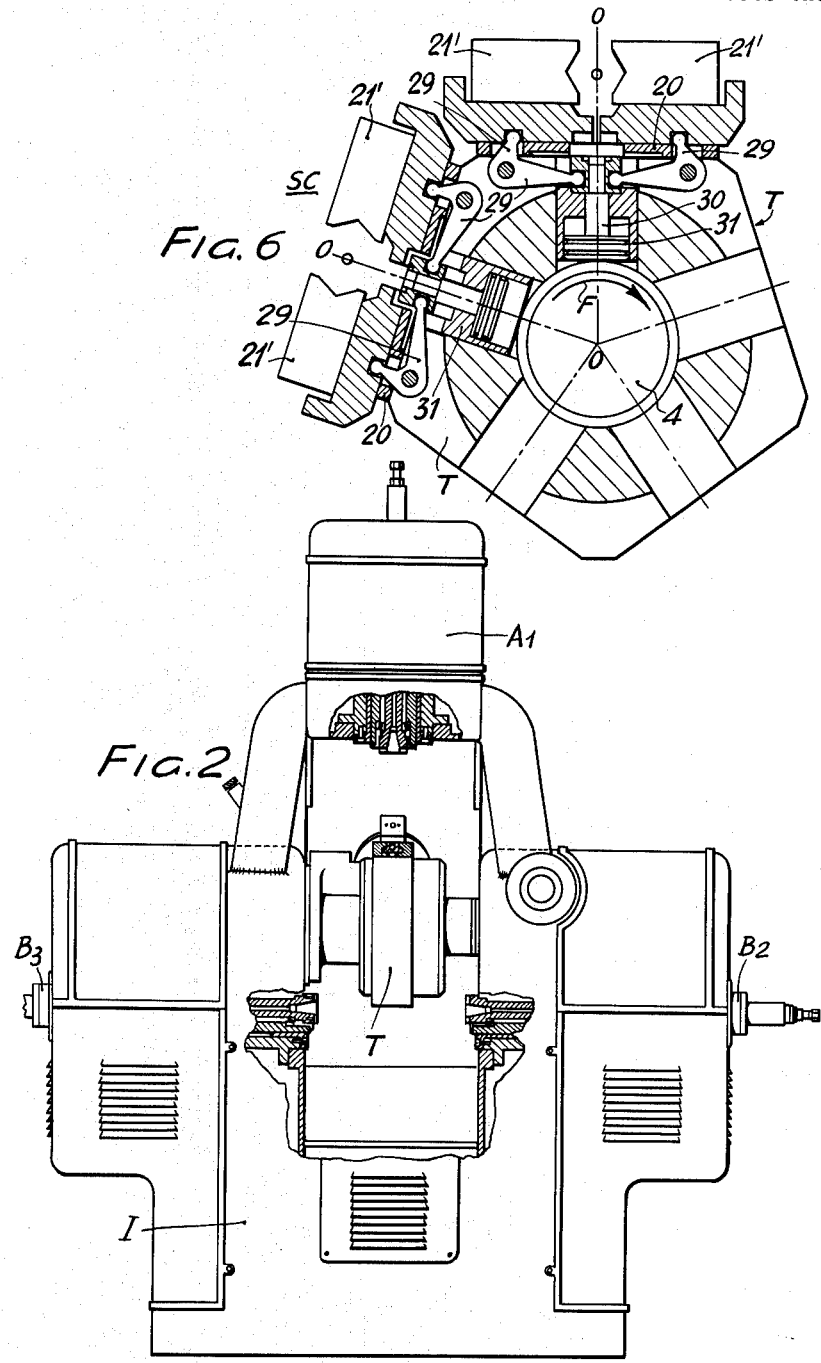

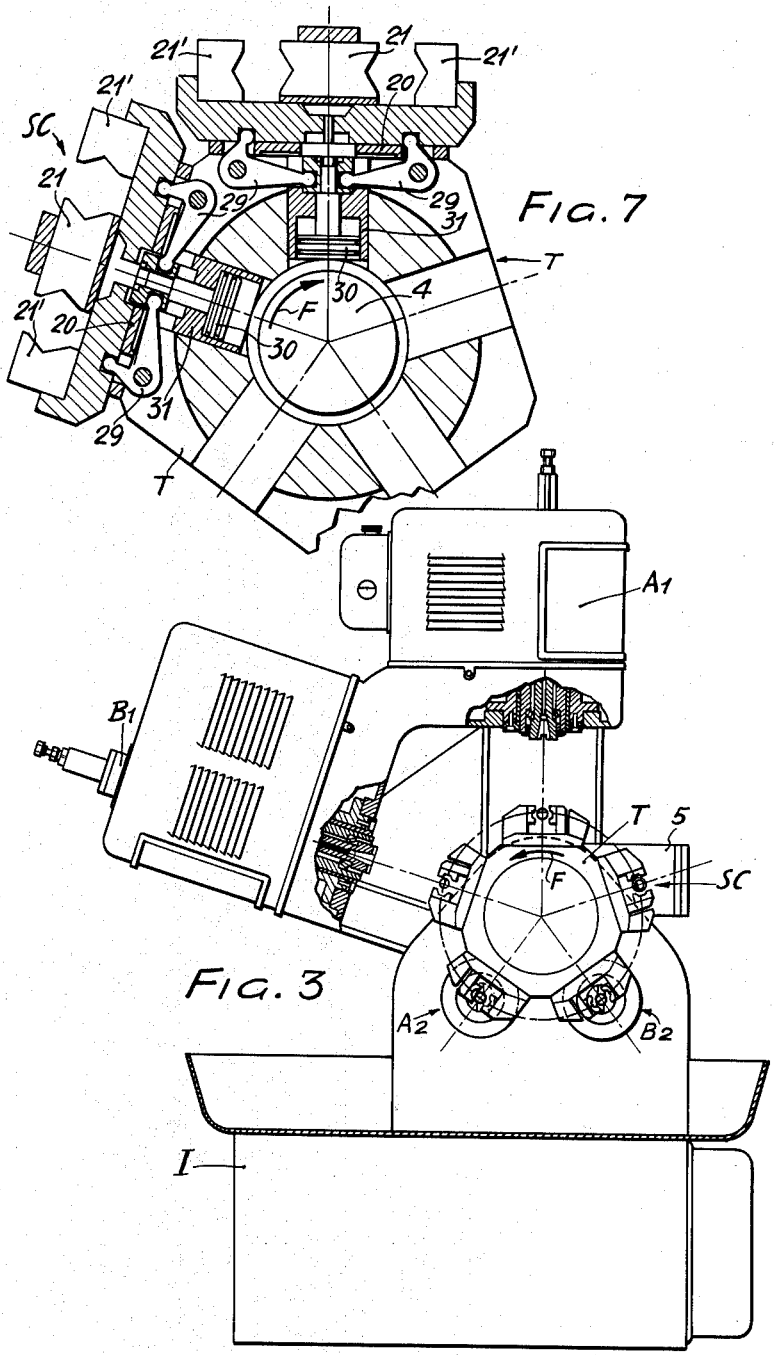

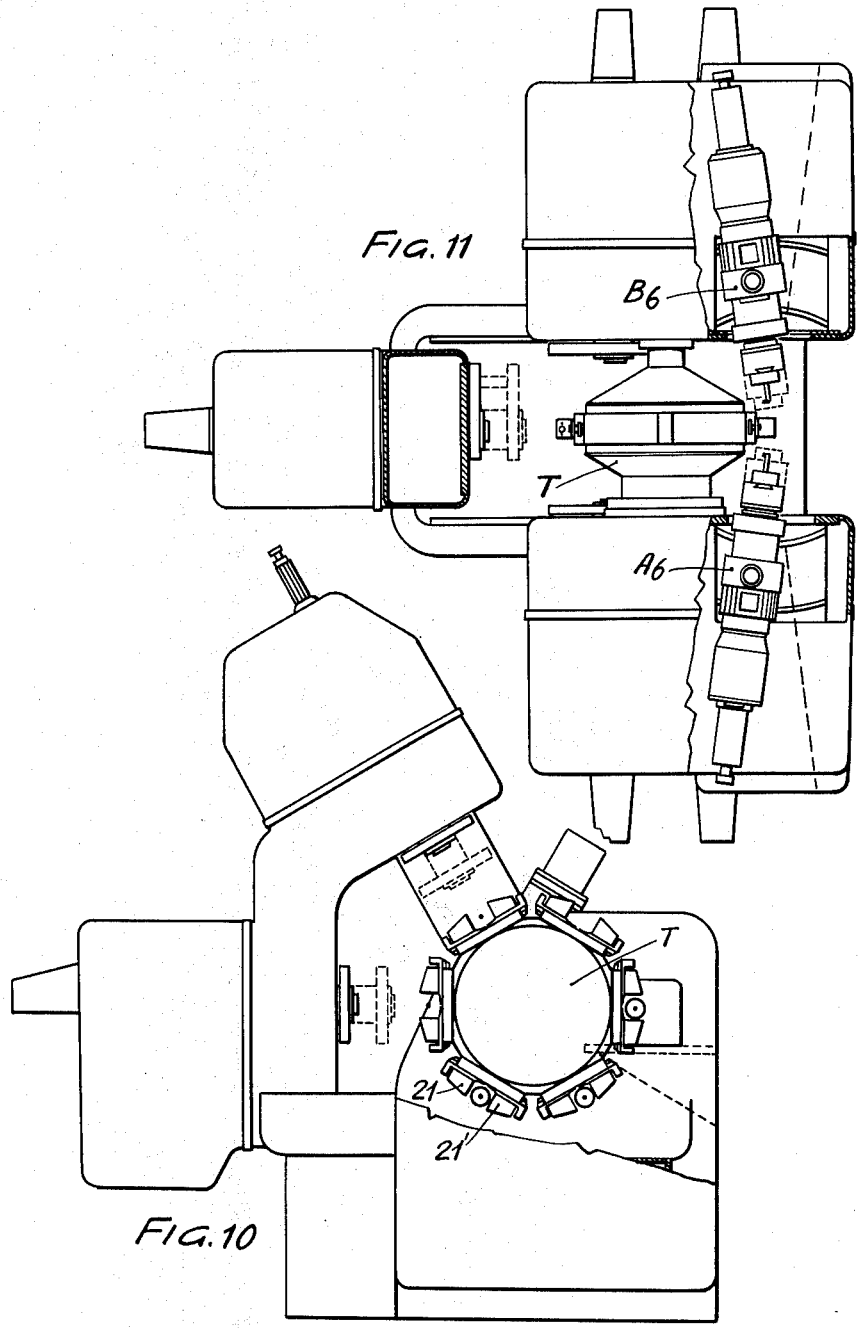

United States Patent Office 3,226,742
Patented Jan. 4, 1966

3,226,742
INDEXIBLE TURRET MEANS
Quirino Gnutti, Lumezzane, Brescia, Italy
Filed Oct. 17, 1963, Ser. No. 316,962
Claims priority, application Italy, Jan. 16, 1960,
Patent 622,124
3 Claims. (Cl. 10—128)

This is a continuation-in-part of application Serial No. 42,269, filed July 12, 1960, and now abandoned.

The present invention relates to the production of connecting pieces for cocks and the like, that, those metallic bodies having threaded sockets or holes. Each of these sockets or holes is obtained by means of a first operating unit effecting the boring operation and a second operating unit effecting the screw cutting or threading of the hole produced by the first boring unit.

The important concept of the present invention is a machine provided with a rotatable turret having vises thereon. The vises are automatically actuated to unclamp a T-shaped or L-shaped workpiece therefrom at a discharge position of the turret and to automatically clamp a workpiece therein before the turret reaches a first of several working positions, and to maintain the workpiece therein throughout the turret's movements to each working position. At each workng position there is provided in succession a boring unit and a screw-cutting unit so that boring operations and screw-cutting operations can take place contemporaneously on different portions of the workpieces to thereby provide a continuous operation. Moreover, it should be pointed out that since the boring and screw-cutting operations take place in succession in the present invention, no damage is effected on the boring and screw-cutting units as when either boring or screw-cutting operations are performed at right angles to one another, at the same time and at the same working position and cleaner bores are provided in the workpieces.

The boring and screw-cutting machine according to the present invention comprises frame means, turret means rotatably mounted to said frame means, vise means disposed on said turret means for clamping workpieces therein, means operatively connected to said turret means to intermittently move same to various positions, including a loading position at which workpieces are disposed in said vise means, a plurality of work stations at which boring and screw-cutting operations are performed on the workpieces and a discharging position at which the finished workpieces are discharged from said vise means, means disposed in said turret means and operatively connected to said vise means to operate same upon rotation of said turret means to automatically unclamp said vise means at said discharging position to discharge finished workpieces therefrom and to automatically clamp workpieces in said vise means prior to said turret means reaching the first of said plurality of work stations, and operating means mounted on said frame at spaced stationary positions corresponding to said plurality of work stations, some of said operating means being disposed in a direction perpendicular with respect to the axis of said turret means with other of said operating means disposed in a parallel direction with respect to the axis of said turret means, each operating means being provided with operating units acting along said directions so that each workpiece is first positioned at the working position at which the boring operation takes place and then at the working position at which the screw-cutting operation takes place, the operations at the various-working positions taking place contemporaneously on different workpieces.

Objects, characteristics and advantages of the present invention will readily appear from the following detailed specification of some embodiment which are given by way of example only and not in any limitative sense by referring to the accompanying drawing in which:

FIG. 1 is a perspective diagrammatic view of a boring and screw-cutting or threading machine according to the present invention;

FIG. 2 is a front view of the machine of FIG. 1;

FIG. 3 is a partially sectioned side view of the machine of FIG. 1;

FIG. 4 is a section through the driving system for the work supporting turret in the machine of FIG. 1;

FIG. 5 shows an enlarged section of the work supporting turret mounted on the machine of FIG. 1;

FIG. 6 shows a modified work supporting turret which may be substituted instead of the one shown in FIG. 5;

FIG. 7 shows a modified work supporting turret;

FIG. 8 shows a tool supporting head adapted to cooperate with the turret of FIG. 7; and FIG. 9 shows a section through the driving system for imparting the feed and rotary motion to the tool supporting head of the screw cutting or threading unit.

FIG. 10 is a side view of a machine having eight operating units and a turret with 6 stations thereon; said machine being particularly suitable for machining gate valves.

FIG. 11 is a plan view of the machine of FIG. 10, wherein a pair of operating units (chucks) may be oriented in any direction to adpat themselves to the different inclinations of the connecting portions of the works.

In the different figures the same reference numerals are used to indicate similar parts.

Even if in the specification reference is made to a pentagonal and actagonal turret, it is obvious that different modifications and variants may be made in the form and in the number and the disposition of the different parts according to the different practical requirements.

The boring and screw cutting machine represented in FIGS. 1, 2 and 3 is constituted by a supporting frame I which carries three pairs of operating units, each formed by a boring unit $A_1$, $A_2$, $A_3$ and a screw cutting or threading unit $B_1$, $B_2$, $B_3$ respectively. The screw cutting unit B follows the corresponding boring unit A in the feed sense of the turret T carrying the workpiece P. While the boring and screw cutting units $A_1$ and $B_1$ have a working axis directed towards the center of rotation of the turret, the other units are disposed almost horizontally. Each of said operating units is provided with a pulley 1 adapted to operate a tool fixed in the cone of the head of the operating unit. The mechanism for transmitting the drive is well known in machine 5 of this type and does not need to be described here. For instance for the screw cutting units a device clearly represented in FIG. 9 may be used to impart the required feed and rotary motion to the shaft or chuck 3. In the embodiment shown in FIG. 9 the spindle 2 regulating the length of the feed motion for each rotation of the chuck 3 may be readily disassembled and substituted to effect a screw cutting of different thread. As the systems for driving the chuck 3 are well known in the art they will not be described here. It should be noted that the operating units $A_1$ and $B_1$ may be mounted in an inclinable manner up to 45° for instance by fixing them on a supporting plate which may be oriented in different ways and is provided with clamping means. It is essential however that the inclination of the boring head $A_1$ and of the screw cutting head $B_1$ be identical with respect to the workpiece P. Also the other units may be oriented in a way different from the represented one but in this case they must be disposed in different working stations in order to maintain the essential characteristics of the invention namely that in a single working station there are no working units with intersecting axes which would otherwise impair the contemporaneous function of all the operating units. In the considered case the working axes $A_1$ and $B_1$ form together an angle of 72°.

In the illustrated embodiment there are four working stations and one loading and discharging station SC; two working stations consisting each of an operating unit $A_1$ and $B_1$ respectively, while the other two stations consist each of two operating units $A_2$–$A_3$ and $B_2$–$B_3$, disposed one at one side of the turret T and the other on the opposite side and having a common working axis.

In the central part of the frame I a turret T is mounted fixed to the shaft 4. Said shaft 4 is intermittently rotated in a predetermined sense as indicated by the arrow F, namely clockwise in the case of FIGURES 5 and 6 and counterclockwise in FIG. 3 in a direction proceeding from the loading station SC to the first working station formed by the boring unit $A_1$. The shaft 4 is set into motion by means of a pneumatic system such as the one shown in FIG. 4. Said driving system consists of a double acting cylinder 5 that is a cylinder subdivided into two chambers 6 and 7 by means of a centrally bored partition wall 8, a double piston moving through the hole of said wall 8 and having a rod 10 protruding out of the cylinder 5 and provided with a toothed rod 11 engaging a toothed sector 12 mounted by means of a so called free wheel on one-way clutch connection on the shaft 4. The piston 9 consists of two heads 13 connected on the shaft 14 which passes through the central hole of the partition wall 8.

The central part of the cylinder 5 comprised between the heads 13 of the piston 9 is filled with a viscous fluid for instance oil and the chambers 6 and 7 of the cylinder 5 are respectively put in communication by means of conduits 15 and 16. Said conduits 15 and 16 are alternatively put in communication with a generator of compressed fluid for instance air or with the atmosphere. This driving system may be controlled electrically. By varying the stroke of the piston the single displacement of the turret may be varied accordingly, in the case of a pentagonal turret said displacement amounting to about 72°.

Assuming that the piston is in the end stroke position, by putting the conduit 15 in communication with the compressor or generator of compressed air, the piston as well as the toothed rod 11 connected with the rod 10 of said piston is urged towards the right as seen in FIG. 4. The toothed rod 11 sets into motion the toothed sector 12 thus displacing the shaft 4 clockwise. When at the end of the stroke, that is, in the right limit position, the feeding of the compressed air is reversed, said air filling now the right chamber 7 while the left chamber 6 is vented to the atmosphere, the piston is urged towards the left thus taking the toothed rod 11 and the toothed sector 12 back into their original position while the shaft 4 stays still. Then this minor cycle corresponding to a single workstep is repeated. The oil contained between the heads 13 of the piston acts as a hydraulic dynamic brake, as a braking effect results by virtue of its high viscosity and of the small passage area 8a defined between the shaft 14 of the piston and the partition wall 8. By varying the properties of the oil or other fluid used, as well as the passage area provided for the fluid, the braking effect i.e., the displacement speed of the piston may be varied at will.

As mentioned before, a work supporting turret T is fixed to the shaft 4, said turret being for instance of the type shown in the FIGURE 5. Each side of the turret carries a dog or vise supporting in its turn the workholding jaws. At the loading station SC the jaw 21 is fixedly mounted on vise 20 while the jaw 21', opposite to it, is mounted for movement between a clamping position and an unclamping position. The movable jaw 21' is urged into its unclamping position by means of a compression spring 22 and into its clamping position by means of a lever 23 pivoted at 24 and acted upon by a piston 25. There are five such pistons 25 slidably mounted in bores 26 which extend from the center of the turret up to its corners. Each piston 25 ends towards the inside with a roller or similar surface suited to slide on the profile of a cam 28 fixed with respect to the frame.

The functioning of the turret shown in FIG. 5 is the following: the jaws 21 and 21' of the vise 20 disposed in register with the loading station SC are open because the piston 25 is in lowered position and the movable jaw 21' is urged by the spring 22 to its spaced position with respect to the fixed jaw 21. Therefore a workpiece P may be readily introduced between the jaws. When the turret starts moving the piston 25 goes up the cam surface 28 and, overcoming the action of the spring 22 urges the movable jaw 21' towards the fixed one 21 thus clamping the workpiece P. Said workpiece P stays in clamped condition until the piston 25 associated to the movable jaw 21' again reaches the lowered zone of the cam surface 28 at the end of a complete rotation or work cycle, so that said workpiece P may be readily removed from the turret and in its place a new piece is put on the turret as explained before.

The functioning of the machine will be now described referring in particular to the production of a T-shaped union which is to be provided with threaded holes on the three arms. Said workpiece P is placed between the open jaws in the station SC as previously mentioned. The turret T is set into rotation and will perform an angular displacement of practically 72° carrying the first workpiece P under the boring unit $A_1$ (FIG. 3) while in the station SC a second workpiece P loaded.

The boring tools $A_2$ and $A_3$ are coaxial with one another and operate sequentially, that is, when the tool $A_2$ begins boring, the tool $A_3$ is still stationary, so that the two tools do not meet in the center of the workpiece fixed in chuck 3 of the polygonal turret T.

The screw tools $B_2$ and $B_3$ are coaxial with one another but are displaced from each other by a step of turret T, and tools $A_1$ and $B_1$ which are perpendicular to the tools $A_2$, $A_3$ and $B_2$, $B_3$ are displaced from each other by a turret step.

While the boring tool $A_1$ makes a hole on the workpiece, the screw tool $B_1$ threads a workpiece held in the next position; simultaneously, the boring tool $A_2$ bores a piece fixed in the next position and the screwing tool $B_2$ threads a piece fixed in the next position. At the same time, the boring tool $A_3$ bores the piece fixed in the associated position with a delayed starting in respect of $B_2$. If the piece to be worked is of a T shape or of L shape, it is necessary that the tools $A_1$ and $B_1$ be perpendicular relative to the tools $A_2$, $A_3$ and $B_2$, $B_3$. Hence the turret is rotated again bringing the first finished piece back to the station SC where the clamping jaws 21 and 21' are opened so that said finished piece may be removed while a new workpiece is loaded in its place whereafter a new cycle analogous to the described one corresponding to the complete rotation of the turret T is started.

As the single operating units do not interfere, it is possible to contemporaneously machine four workpieces while a fifth workpiece is in loading or discharging position with respect to the turret. That is, for each rotation of the pentagonal turret of 72° a finished piece may be provided, i.e., for each complete rotation of the turret five pieces are manufactured.

FIG. 6 shows a turret T which may be mounted in substitution to the turret of FIG. 5 in the machine shown in FIG. 1. Said turret is preferable as it has self centering jaws as will be seen from the following description. In fact two movable jaws 21'—21' symmetric with respect to the axis O—O are mounted on each vise 20 mounted on each side of the turret T. Said jaws 21' are driven each by a lever 29 whereby both levers 29—29 for the pair of jaws 21'—21' are actuated by the stroke of a piston 20 slidably mounted within a cylinder 31; said piston 30 may be for instance pneumatically driven. In the first loading station SC the lower part of the cylinder is set into communication with a compressed fluid which may be for instance the one used to set into motion the turret T so that the piston 30 is lifted carrying the jaws 21'—21' in spaced position. In the other positions on the contrary it is the upper part of the cylinder which is in communication with the compressed fluid so that the piston 30 is maintained in lowered or clamping position for the work. In clamping condition the distance between the jaws 21'—21' may be adjusted to fit to the dimensions of the work which last at any rate will always be self-centered. Also by means of this turret it is possible to carry out the contemporaneous machining of five workpieces in successive stages.

By means of the embodiment shown in FIGS. 7 and 8 it is possible to effect the contemporaneous machining of twice the number of workpieces as with the embodiments previously described. That is, with a pentagonal turret T is possible simultaneously to handle eight workpieces, to discharge two finished pieces and to load two new workpieces. In said embodiment the tool U of each operating unit is substituted by a head having a double tool U'–U' as shown in FIG. 8. Such a head is mounted on the cone of the chuck 3 so that the movement of this last is transmitted to both of the tools U'–U'. Therefore even in such a case the fundamental characteristic of the invention is maintained namely the characteristic of having in each station a single working or displacement direction of the tools so that the said tools do not interfere and may function contemporaneously. When the operating units are modified in such a manner the shaft 4 carries fixed thereto a turret of the type shown in FIG. 7 wherein each vise supports two pairs of jaws one 21 being fixed while the other 21' is movable. In the considered case a single central element laterally profiled constitutes the fixed jaws 21—21 of the two pairs of jaws. The displacement of both these movable jaws 21' is imparted by a pneumatic system similar to the one shown in FIG. 6. It should be noted that in said position the two pairs of jaws are driven in unison, at the loading and discharging station SC said jaws being both in disengagement or unclamping position while in the other stations they are in work clamping condition.

The embodiment with the head having two tools as represented in FIG. 8 or with the head having several tools disposed in any possible way is convenient to permit any desired machining in a predetermined direction on more portions of a single workpiece or alternatively or more workpieces contemporaneously. Therefore by substituting the head of the operating units and possibly the work-holding vise of the turret it is possible to perform suitable machining operation 3 on different workpieces and practically to produce all the known connecting pieces for cocks and the like by utilizing the same machine.

FIGURES 10 and 11 show a machine with eight operating units (chucks) for gate valves and faucets in general, two of said chucks (FIG. 11) being adapted to be swung horizontally so as to make them suitable for the various workpieces.

The machine shown in FIGS. 10 and 11 comprises a turntable T rotating about a horizontal axis and having a hexagonal form. Said turntable rotates therefore clockwise each time through a 60° angle; the workpieces are maintained in a fixed position by the self-centering clamps or jaws 21-21' in any dseired well known manner.

An important feature consists in the presence of the two above mentioned horizontally swingable units $A_6$ and $B_6$ the axes of which may be displaced in a horizontal plane at angles between $\pm 7.5°$, whereby said angle may be larger if a particular work process should require it. This machine also functions to flatten the inner end surfaces of the conical seats of the gate valves and similarly the plane surfaces of the complementary conical male members.

There are in this case three chucks for the drilling units, three chucks for the tapping units and two swingable units $A_6$ and $B_6$ for flattening the conical seats. The swingable units are controlled by means of electric motors with intermediately disposed gear boxes. The control system therefore is an oil-pneumatic system. The turntable T has six stations thereon: five of them are operating stations and the other one serves for charging and discharging the workpieces. A safety device (not shown) is provided for preventing the feed motion of the drilling and tapping units unless the turntable is in its correct position, thus eliminating any danger of breaking the tools.

It is obvious that the various described embodiments of the machine may be modified as a whole as well as in their constructive details according to practical requirements without departing from the scope of the present invention.

What is claimed is:

1. In a machine tool comprising a frame, a turret mounted for rotation on the frame, means defining a plurality of work stations spaced apart equal peripheral distances about the turret, reciprocating power means, and means for converting reciprocation of said power means to intermittent rotation of the turret thereby to position a portion of the turret successively in registry with the work stations; the improvement comprising said power means including a cylinder, a pair of axially spaced pistons slidable in the cylinder, a partition across the interior of the cylinder between the pistons, piston rod means interconnecting the pistons and extending through the partition, a quantity of hydraulic fluid between said pistons and on both sides of said partition, means defining a restricted passageway for said hydraulic fluid between opposite sides of said partition, and means for introducing fluid under pressure selectively to either end of the cylinder on the sides of said pistons opposite said partition.

2. Apparatus as claimed in claim 1, said last-named means comprising means for introducing compressed air into opposite ends of said cylinder.

3. Apparatus as claimed in claim 1, said means which defines a restricted passageway comprising a portion of said partition confronting said piston rod means.

References Cited by the Examiner
UNITED STATES PATENTS

| | | | |
|---|---|---|---|
| 321,023 | 6/1885 | Hammer | 10—131 |
| 438,241 | 10/1890 | Rauhe | 77—31 |
| 1,610,695 | 12/1926 | McKee | 10—128 |
| 1,664,740 | 4/1928 | Doane | 10—32 X |
| 1,912,184 | 5/1933 | Ferris et al. | 10—128 |
| 2,122,356 | 6/1938 | Bullard et al. | 10—107 |
| 2,622,487 | 12/1952 | Schultz | 74—822 |
| 2,803,840 | 8/1957 | McShirley | 10—131 |
| 2,871,732 | 2/1959 | Olson | 74—822 X |
| 3,134,276 | 5/1964 | Abrams | 74—822 X |

ANDREW R. JUHASZ, *Primary Examiner.*